United States Patent [19]

Schutt

[11] 4,395,625

[45] Jul. 26, 1983

[54] CONTAINER COUNTER

[76] Inventor: Donald W. Schutt, 2440 Orchard Ave., Holland, Mich. 49423

[21] Appl. No.: 232,736

[22] Filed: Feb. 9, 1981

[51] Int. Cl.$^3$ .................. G06M 7/02; B65G 27/00
[52] U.S. Cl. ............................ 235/98 C; 198/446
[58] Field of Search ............... 235/98 R, 98 B, 98 C; 209/920; 198/446; 221/7

[56] References Cited

U.S. PATENT DOCUMENTS 2,023,574  12/1935  Cohn ........................... 235/98 C
2,530,419  11/1950  Bourland ......................... 198/446

OTHER PUBLICATIONS

Potter Instrument Company Brochure, 1951.

Primary Examiner—L. T. Hix
Assistant Examiner—Thomas H. Tarcza
Attorney, Agent, or Firm—Price, Heneveld, Huizenga & Cooper

[57] ABSTRACT

A container counter for counting elongated objects such as empty beverage cans including a hopper for receiving objects to be counted, a plurality of chutes located below and communicating with the hopper for conveying objects out of the hopper, and an oscillating grid positioned above the chutes to assist objects in becoming properly oriented to pass out of the hopper and into the chutes. A sensing device is mounted on each chute to detect a passing object and emit a signal. A summer is connected to the sensing devices to sum the signals and display a total count.

16 Claims, 11 Drawing Figures

U.S. Patent   Jul. 26, 1983   Sheet 1 of 3   4,395,625
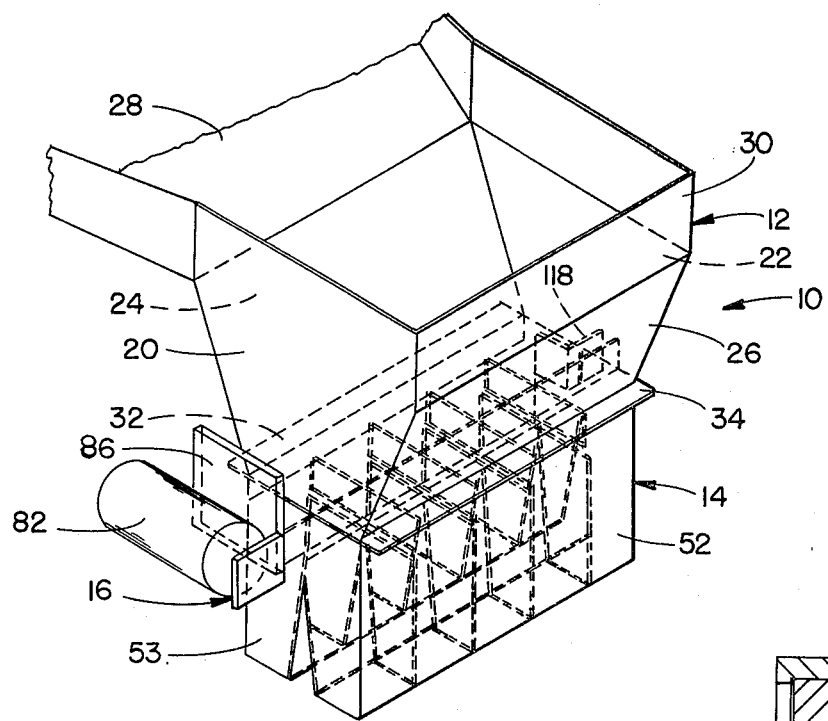
FIG. I
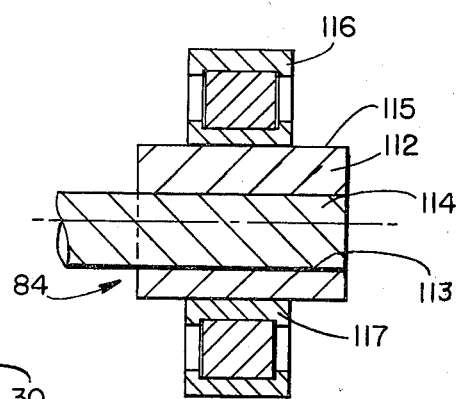
FIG. II
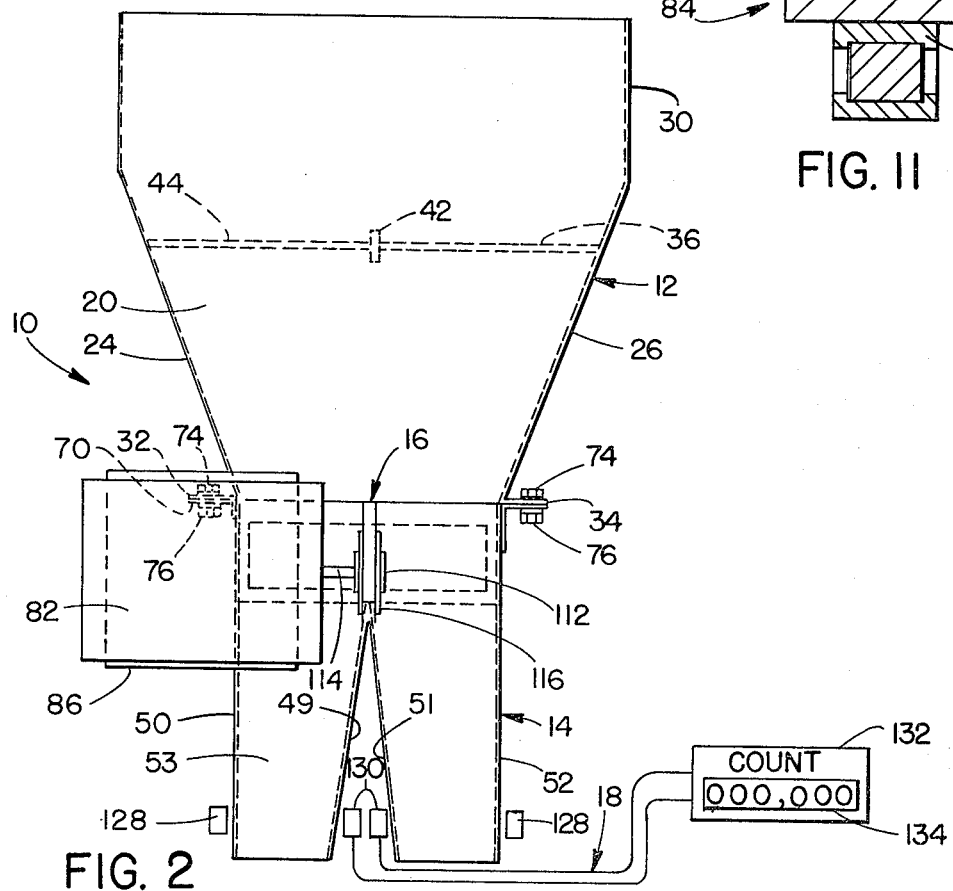
FIG. 2

CONTAINER COUNTER

BACKGROUND OF THE INVENTION

1. Field of the Invention

The present invention relates to apparatus for counting objects and, more particularly, to apparatus for counting elongated cylinders such as beverage containers.

2. Description of the Prior Art

Several of the United States have laws requiring retail vendors of beverages to collect a deposit on each container when the beverage is sold and refund this deposit when the empty container is returned. In fact, a bill is currently before Congress which would require a nationwide deposit on "returnables." The objects of these "bottle bills" are (1) to reduce litter and (2) to encourage recycling, thereby conserving resources used in manufacturing the containers. Counting returned, empty containers is crucial under these laws because of the deposits involved.

Obtaining an accurate count of and collecting deposits for containers sold is relatively easy because the containers, such as bottles and cans, are generally packaged for sale in cartons, cases and/or plastic connecting strips. This packaging enables the retailer to quickly and easily count the containers on which a deposit is collected. However, counting the number of empty containers returned is extremely difficult because these containers, especially cans, are usually returned in bulk, for example, in paper or plastic bags. These containers are returned in bulk because this is the easiest way for consumers to return the cans to the store.

Consequently, counting the returned containers presents a difficult problem for both the retailer and the distributor, to whom the cans are ultimately returned. A number of prior art counting methods have been developed, none of which is both cost efficient and accurate.

The most common way in which the returned cans are counted is to have individual workers visually count each can. The worker may either (1) physically handle and count each can or (2) count the cans as they pass by the worker, for example, on a conveyor. Obviously, this approach has significant drawbacks. First, it requires a relatively large labor force, which is extremely expensive. Second, the counts may be inaccurate because of human error due to day-dreaming and inattention among other reasons.

A second prior art approach to counting the returned cans is to weigh the cans in bulk. Although this method proceeds fairly rapidly, the counts provided are generally inaccurate. This is because other material such as residual liquid in the cans, biases the count upwardly. Because the cans are relatively light, even a small amount of additional material can throw the count off. Furthermore, different brands of cans often have different individual weights, which affects the can count, and cans vary in size according to their capacities (e.g., 12 or 16 ounces).

SUMMARY OF THE INVENTION

In recognition of the drawbacks and problems of the prior art, it has been conceived that a container counter should handle and count the containers with a minimum of human intervention to improve the accuracy of the counts obtained. Furthermore, the counter should separately count individual cans to provide an accurate, reliable count independent of weight. Finally, the counter should possess the ability to handle and count different height containers.

The prior art problems and drawbacks are overcome in the present invention comprising a counter having relatively few moving parts. The counter includes a hopper for receiving cans in bulk and a plurality of chutes located below and communicating with the hopper for conveying cans out of the hopper. The size of the chutes is selected so that a can can pass through a chute only when in a generally lengthwise vertical orientation. Structure is included for assisting the cans into this desired orientation as they pass from the hopper into the chutes. A sensor is included on each chute to detect the passage of individual cans. All of the individual sensors are connected to a summer which provides a total count of the cans passing through the counter since the summer was last reset.

Because the container counter of the present invention detects individual cans, an accurate count is obtained regardless of container length or weight. Human error will not distort the count because all of the sensing and summing is performed using either electrical or mechanical apparatus. Only one operator, who inserts the cans in bulk into the hopper and reads and resets the summer as necessary, is required to operate the counter.

These and other objects, advantages and features of the invention will be more fully understood and appreciated by reference to the written specification and appended drawings.

BRIEF DESCRIPTION OF THE DRAWINGS

FIG. 1 is a perspective view of the container counter with the coarse grid in the hopper omitted;

FIG. 2 is a side elevation of the container counter;

FIG. 11 is a cross-sectional view taken along plane XI—XI in FIG. 7.

DESCRIPTION OF THE PREFERRED EMBODIMENT

Figure 3:
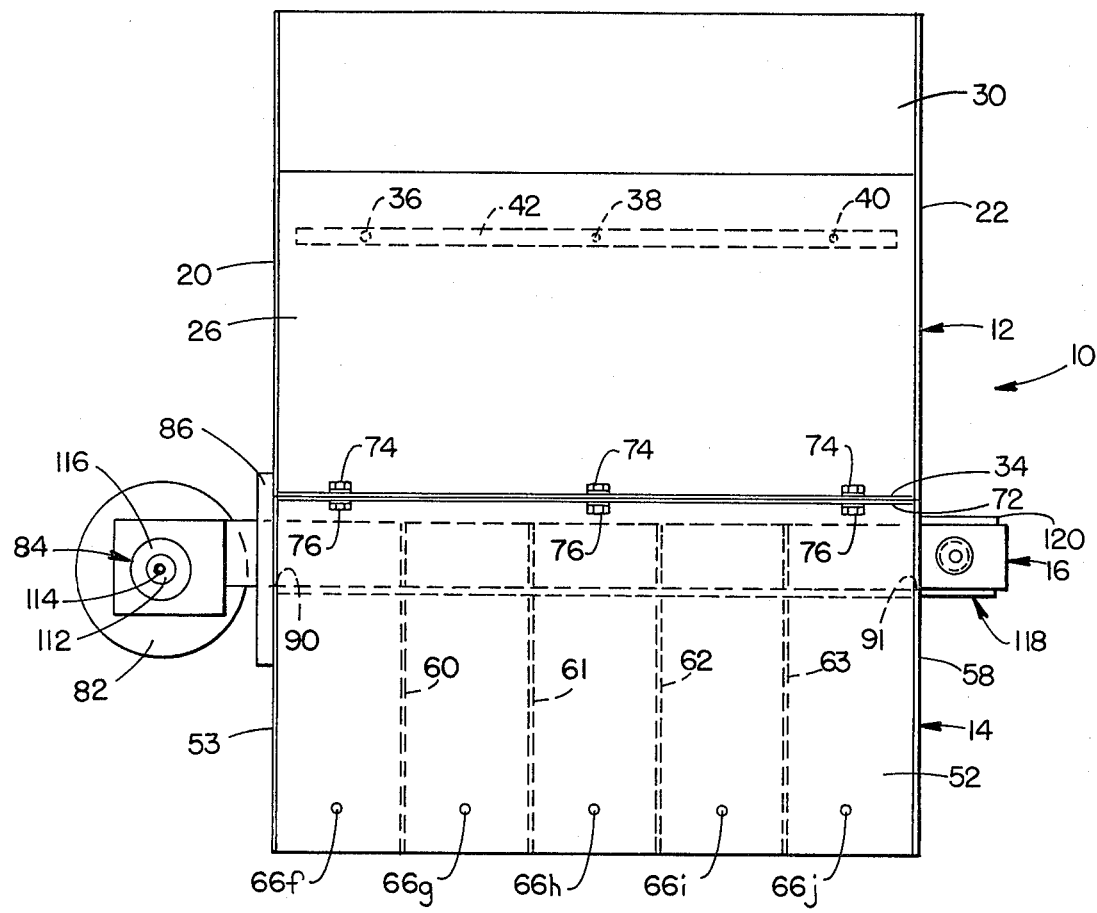
FIG. 3 is a front elevation of the container counter.

Container counter 10 (FIGS. 1, 2, 3 and 4) generally comprises hopper 12, chutes 14, shaker grid assembly 16 and counting assembly 18. Containers to be counted are loaded into hopper 12. These containers are emptied out of hopper 12 through chutes 14 in a generally lengthwise, vertical orientation. Shaker grid assembly 16 assists in so orienting the containers as they pass from hopper 12 into chutes 14. The passage of individual containers through chutes 14 is detected and summed by counting assembly 18. Consequently, a rapid and accurate count of containers passing through counter 10 is provided. Container counter 10 of the preferred embodiment has been designed to count elongated cylinders having a uniform diameter, such as beverage cans. However, the counter could also be used to count other objects.

Hopper 12 is generally rectangular in horizontal cross section and tapers inwardly from its upper end to its lower end. The rectangular cross section of hopper 12 is defined by walls 20, 22, 24 and 26. Walls 20 and 22 are generally vertical and parallel to each other, while walls 24 and 26 incline outwardly and upwardly. The inclination of walls 24 and 26 facilitates flow of containers through hopper 12. Although the optimum inclination of walls 24 and 26 will vary with the size and shape of containers counted, it has been found that an inclination of 23° from vertical provides the optimum flow for beverage containers having a diameter of approximately 2½ inches.

In the preferred embodiment, wall 24 terminates at its upper end at input slide 28 whose function is to increase the capacity of hopper 12. It is understood that input slide 28 could be deleted without departing from the spirit of the invention. Wall 26 terminates at its upper end in vertical portion 30 which may be of any height, also to increase the capacity of hopper 12. Hopper flanges 32 and 34 extend generally horizontally outwardly from the lower edge of walls 24 and 26 and are used to secure hopper 12 to chutes 14 as will be described.

Hopper 12 in the preferred embodiment is constructed of four pieces of sheet metal joined by welding. The first piece comprises wall 20; the second, wall 22; the third, wall 24 and flange 32; and the fourth, wall 26, vertical portion 30 and flange 34.

Plate 42 is positioned midway between walls 24 and 26 and lies generally parallel thereto. The ends of plate 42 are closely proximate but do not touch walls 20 and 22. Extending between plate 42 and wall 26 are rods 36, 38, and 40. These rods are formed of hot rolled steel and are welded to both plate 42 and wall 26. Likewise, rods 44 (FIG. 2) and 46 and 48 (not shown) extend between wall 24 and plate 42. These rods are also formed of hot rolled steel and are welded to both plate 42 and wall 24. This rod and plate assembly forms a coarse grid when viewed from above the container counter, although for clarity this grid has been omitted from FIGS. 1 and 4. The purpose of this grid is to improve vibration of hopper 12 as will be hereinafter described in order to further facilitate container flow through hopper 12.

Chutes 14 are located directly below and communicate with hopper 12. The preferred embodiment contains ten of these chutes, denominated 14a through 14j, although it is to be understood that any number could be provided, depending upon the specific application. Chutes 14 are organized in a two-by-five rectangular array (FIG. 4) and are partitioned using sheet metal. Outer wall 50 is a single piece of sheet metal and provides a common wall for chutes 14a through 14e. Likewise, outer wall 52 provides a common wall for chutes 14f through 14j and is generally parallel to outer wall 50. Inner walls 49 and 51 also provide common walls for chutes 14a through 14e and 14f through 14j, respectively. Inner walls 49 and 51 are joined together along their upper edges be welding and form an inverted V when viewed from the side (FIG. 2). End walls 53 and 58 are welded to and between outer walls 50 and 52 and inner walls 49 and 51 to complete the external walls of chutes 14. Partitions 54 through 57, generally parallel to one another, are welded between outer wall 50 and inner wall 49 to complete the formation of chutes 14a through 14e. Likewise, partitions 60 through 63 are welded between outer wall 52 and inner wall 51 to form chutes 14f through 14j.

Sender apertures 66f through 66j extend through outer wall 52 into chutes 14f through 14j, respectively. Similarly, sender apertures 66a through 66e (not shown) extend through outer wall 50 into chutes 14a through 14e, respectively. Eye apertures 68a through 68j extend through inner walls 49 and 51 into chutes 14a through 14j, respectively. A portion of counting assembly 18 is operably mounted to sender apertures 66 and eye apertures 68 as will be hereinafter described in order to detect individual containers passing through chutes 14.

Angle irons 70 and 72 are mounted at the upper edge of and extend the entire length of outer walls 50 and 52, respectively. Hopper 12 is mounted on chutes 14 by abutting flanges 32 and 34 against angle irons 70 and 72, respectively, and securing the abutting surfaces together using bolts 74 and nuts 76. Because hopper 12 is rigidly secured to chutes 14, any vibration in one is passed to the other. The vibration in both of these elements assists in the flow of containers through hopper 12 and chutes 14.

Each of chutes 14 is rectangular in cross section and tapers from top to bottom. In order for individual cans to be detected by counting assembly 18, it is important that no more than a single container be permitted to pass through any one of chutes 14 at a time. Consequently, the dimensions of the cross section of the upper ends of chutes 14 should both be less than double the diameter of the containers to be counted. This insures that two cans cannot drop side-by-side through one of chutes 14 and, consequently, individual cans must drop sequentially through chutes 14. This chute size also insures that two cans will not enter the chute side-by-side and lodge in the lower, tapered end of the chute, thereby plugging the chute.

Furthermore, both dimensions defining the cross section at the upper ends of chutes 14 should be less than the length of the shortest can counted. This will insure that containers will not tumble as they pass through chutes 14, which might result in a double counting of a single container. This would occur if the tumbling container were to trip the sensing device of counting assembly 18 twice while falling through one of chutes 14. Because of this chute dimension selection, containers must pass through chutes 14 in a generally lengthwise, vertical orientation.

Shaker grid assembly 16 is positioned between hopper 12 and chutes 14 to assist in the orientation of containers so that same may pass through chutes 14. Generally, shaker grid assembly 16 comprises shaker grid 80, motor 82 and eccentric drive 84. Motor 82 of the preferred embodiment is a one-quarter horsepower, electric motor which operates at 1725 rpm. Motor 82, which includes motor mounting plate 86, is secured to chutes 14 by welding plate 86 to end wall 53. Alternatively, motor 82 could be mounted on hopper 12.

Figure 5:
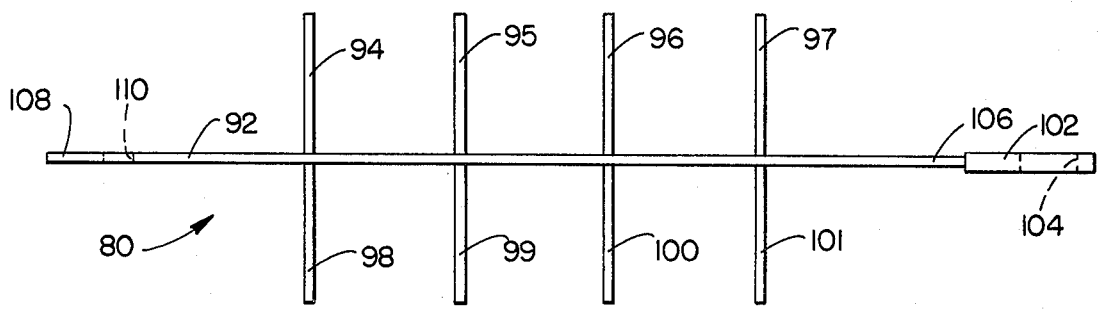
FIG. 5 is a plan view of the shaker grid.
Figure 6:
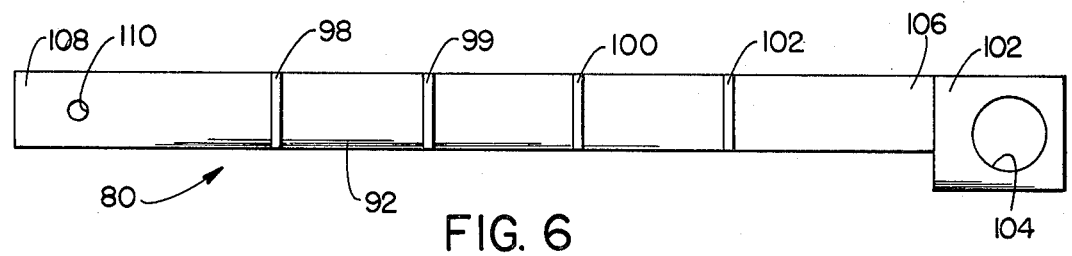
FIG. 6 is a front elevation of the shaker grid.
Figure 8:
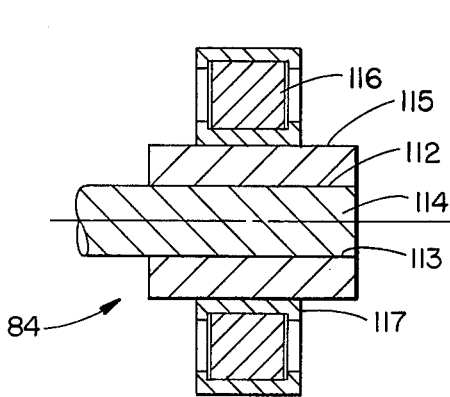
FIG. 8 is a cross-sectional view taken along plane VIII—VIII in FIG. 7.
Figure 7:
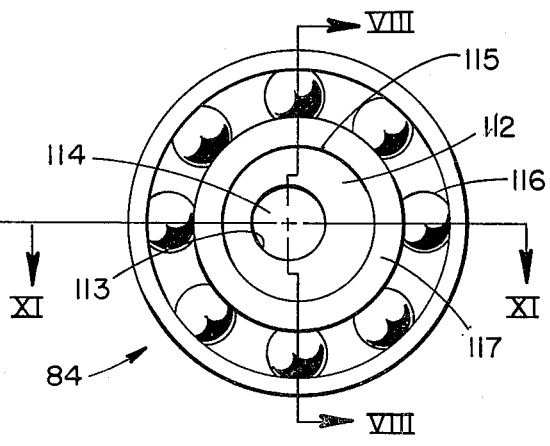
FIG. 7 is a detail of the eccentric drive used on the shaker grid.
Figure 10:
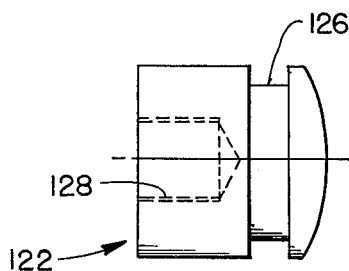
FIG. 10 is a side elevation of the resilient mount.
Figure 9:
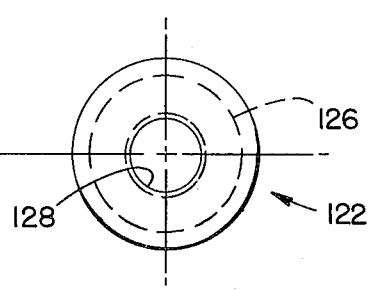
FIG. 9 is a detail of the flexible mount for the shaker grid.

The main body of shaker grid 80 (FIGS. 5 and 6) is drive plate 92, an elongated, rectangular plate formed of hot rolled steel, which extends through apertures 90 and 91 in end walls 53 and 58, respectively. Mounted along one side of drive plate 92 are ribs 94, 95, 96 and 97. Also mounted on drive plate 92 opposite ribs 94–97 are ribs 98, 99, 100 and 101. Ribs 94–101 are also formed from hot rolled steel and mounted on drive plate 92 by welding. The size of ribs 94–101 and the spacing therebetween is selected so that shaker grid 80 approximates the upper ends of chutes 14, as most clearly shown in FIG. 4. Consequently, shaker grid 80 forms a rectangular grid having rectangular openings generally aligned with chutes 14.

Eccentric mount 102 is welded to one end 106 of drive plate 92 and is also formed from hot rolled steel. Aperture 104 extends through eccentric mount 102, and aperture 110 extends through the opposite end 108 of drive plate 92.

Eccentric drive 84 comprises eccentric bushing 112 mounting on motor shaft 114 and roller bearing 116 positioned within aperture 104. Eccentric bushing 112 is suitably mounted on motor shaft 114. The offset of eccentric bushing 112 in the preferred embodiment (i.e., the distance between the centers of aperture 113 and outer surface 115) is approximately 1/16 inch. Roller bearing 116 is operably mounted on eccentric bushing 112 and may be any type of conventional bushing material. Roller bearing 116 is in turn positioned within aperture 104.

During operation of container counter 10, as shaft 114 rotates, eccentric bushing 112 performs a camming function on roller bearing 116. Inner race 117 rotates with eccentric bushing 112. Roller bearing 116 is displaced in circular motion as eccentric bushing 112 rotates therein. This circular motion of roller bearing 116 is transferred through eccentric mount 102 to shaker grid 80. Consequently, as motor 82 operates at approximately 1725 rpm, shaker grid 80 is vigorously oscillated or vibrated.

Figure 4:
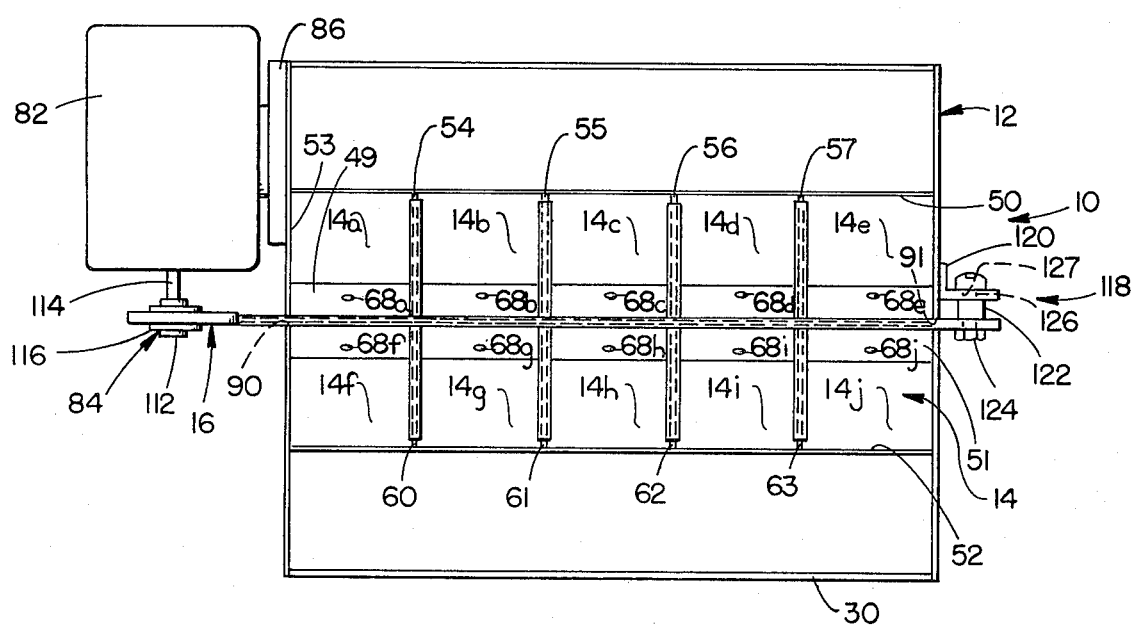
FIG. 4 is a plan view of the container counter with the coarse grid in the hopper omitted.

Aperture 110 of shaker grid 80 is mounted on resilient mount 118 which generally comprises bracket 120, stud 122 and bolt 124. Bracket 120 is L-shaped and secured to end wall 58 by welding. Stud 122 is fabricated of a stiffly resilient material and contains an integrally formed, annular groove 126 which is fitted within aperture 127 in bracket 120 (FIG. 4). Drive plate 92 is mounted to stud 122 by passing bolt 124 through aperture 110 and into threaded portion 128. When mounted in this manner, shaker grid 80 is free to oscillate or vibrate with motion of eccentric drive 84.

Eyes 130 are positioned within the void between inner walls 49 and 51. Both senders 128 and eyes 130 (FIG. 2) are mounted aligned with sender apertures 66 and eye apertures 68, respectively. Each of senders 128 is focused so as to project its beam through its corresponding sender aperture 66 and eye aperture 68 to eye 130. Senders 128 and eyes 130 may be any type of conventional photoelectric sensors or detectors. Mechanical sensors could also be used. The senders and eyes of the preferred embodiment are those sold as models LR-200 and PT-200 by Banner Engineering Corporation of Minneapolis, Minn.

It is preferred that both sender apertures 66 and eye apertures 68 be positioned no further than the diameter of a can from both of the adjacent side partitions. This placement insures that eyes 130 will emit only one signal for each passing container regardless of that container's gyrations or oscillations as it passes through chute 14. Once the light beam emitted by one of senders 128 is broken by a passing container, the beam cannot be re-established until the entire container has passed apertures 66 and 68.

All of eyes 130 are electrically connected to summer 132 which sums all of the individual signals. Again, any conventional anti-coincidence summer may be used, but summer 132 of the preferred embodiment is the anti-coincident summer manufacted by Red Lion Controls of York, Pa., as model B 5151102. Display 134 is electrically connected to summer 132 to display the cumulative can count. Display 134 of the preferred embodiment is model CA400T, also manufactured by Red Lion Controls.

OPERATION

Generally, motor 82 is turned on before containers are placed in hopper 12; however, containers could be placed in hopper 12 before motor 82 is started. Containers to be counted are dumped either directly into hopper 12 or into input slide 28, which feeds into hopper 12. The vibration of eccentric drive 84 passes through motor 82 to chutes 14 to hopper 12. This vibration of hopper 12, reinforced and distributed by rods 36, 38, 40, 44, 46 and 48 and plate 42 (FIGS. 2 and 3), facilitates in jiggling or oscillating the containers downwardly through hopper 12. Furthermore, inwardly sloping walls 24 and 26 assist in moving cans downwardly.

When containers reach the bottom of hopper 12, they contact shaker grid 80. Because chutes 14 are narrower than the containers are long, the containers must pass through chutes 14 in a generally lengthwise, vertical orientation. Shaker grid 80 assists in orienting the containers into this vertical orientation as the containers pass from hopper 12 into chutes 14. If both ends of a container rest on portions of shaker grid 80, the oscillation or vibration of shaker grid 80 will move the container until one of the container's ends drops through grid 80 and into one of chutes 14.

As a container passes through one of chutes 14, it is further lengthwise vertically oriented until its trailing end also passes below shaker grid 80. The container continues its downward movement through chute 14 until its lowermost edge breaks the detection beam emitted by sender 128. This beam remains broken until the trailing edge of the container passes sender 128, at which time the beam is re-established so that eye 130 is activated. The vibration of eccentric drive 84 is also imparted through chutes 14 to the cans within the chutes. This can vibration insures that a gap is created between two adjacent cans capable of detection by eye 130.

When the beam is re-established, eye 130 emits a single signal to summer 132 which increments the total can count. The output of the summer is constantly displayed on display 134 so that an accurate can count may be easily read. When a particular run is complete, display 134 is read and the count is noted, for example, on a receipt which is sent to the retailer.

Finally, it should be noted that chutes 14 may be connected to a can grinder or can flattener so that the counted cans may be further processed. In such a scenario, the discharge openings of chutes 14 would be operably connected to introduce the counted containers into the grinder or flattener. The ground or flattened cans can then be blown into a trailer for transport to a recycling center.

The container counter of the present invention accurately and rapidly counts containers. Because individual containers are counted, the count is always exact. Furthermore, the only labor required to operate the machine is introducing containers into hopper 12 and reading and resetting display 134. Finally, the counter produces an accurate count regardless of container length or weight.

Of course, it is understood that the above is merely a preferred embodiment of the invention and that various changes and alterations can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. A container counter for counting elongated objects such as empty beverage cans, each of which has generally the same width and is longer than it is wide, comprising:
    a hopper for receiving objects to be counted;
    a plurality of generally vertical chutes located below said hopper for conveying objects out of said hopper, each of said chutes having an upper, open end communicating with said hopper and a lower, open end, each of said chutes shaped to permit objects to pass therethrough and to prohibit two objects from passing side-by-side therethrough;
    means operably mounted between said hopper and said chutes for assisting in orienting said objects into a generally lengthwise, vertical position as said objects pass from said hopper into said chutes; and
    counting means operably connected to said chutes for counting objects passing through said chutes.

2. The container counter of claim 1 wherein said assisting means comprises:
    a grid positioned adjacent and above said upper, open ends of said chutes, said grid having openings approximating said upper, open ends of said chutes; and
    oscillating means operably connected to said grid for oscillating or vibrating said grid.

3. The container counter of claim 2 wherein said oscillating means comprises:
    a first portion of said grid having a circular aperture therein;
    a shaft;
    an eccentric bearing fixedly mounted on said shaft and rotatably positioned within said aperture; and
    rotating means for rotating said shaft whereby said grid will oscillate as said shaft is rotated.

4. The container counter of claim 3 further comprising a roller bearing positioned within said aperture and around said eccentric bearing.

5. The container counter of claim 4 wherein a second portion of said grid is secured to a resilient mounting whereby oscillation of said grid is facilitated.

6. The container counter of claim 3 wherein said hopper is secured to said chutes and said rotating means is mounted on either said chutes or said hopper whereby said hopper picks up vibration from said eccentric bearing through said shaft and rotating means.

7. The container counter of claim 6 wherein at least a portion of a side of said hopper is inclined inwardly whereby flow of objects through said hopper is facilitated.

8. The container counter of claim 7 wherein said portion is inclined approximately 23° from vertical.

9. The container counter of claim 8 wherein said portion comprises opposed sides of said hopper.

10. The container counter of claim 7 wherein said hopper includes opposed sides and further comprising:
    a first, rigid member positioned between said opposed sides; and
    a plurality of second, rigid members extending from said opposed sides to said first, rigid member, whereby vibration in one of said opposed sides is transferred to another of said opposed sides.

11. The container counter of claim 1 wherein said chutes taper inwardly from said upper, open ends to said lower, open ends.

12. The container counter of claim 1 wherein said counting means comprise:
    a plurality of photoelectric devices, each of which is operably mounted on one of said chutes to detect objects passing through said chutes and emit a signal for each passing object;
    summing means electrically connected to said devices for summing said signals to produce a cumulative count; and
    display means electrically connected to said summing means for displaying said cumulative count.

13. The container counter of claim 12 wherein each of said photoelectric devices is positioned approximately at a midpoint of a horizontal cross section of each of said chutes.

14. A container counter for counting elongated objects such as empty beverage cans, each of which has generally the same width and a length greater than its width, comprising:
    a hopper having upper and lower ends for receiving objects to be counted;
    a plurality of closely adjacent generally vertical chutes located below said hopper for conveying objects out of said hopper, each of said chutes having an upper, open end communicating with said hopper and a lower, open end, each of said chutes tapering inwardly from said upper, open end to said lower, open end, said cross section at said chute upper, open end having dimensions greater than said object width but less than both the shortest object length and double said object width, the sum of the areas of said chute upper, open ends being generally the same as the area of said hopper lower end;
    a shaker grid between said hopper and said chutes, said grid having an elongated plate mounted to either said hopper or said chutes, and a plurality of ribs extending generally perpendicularly from either side of said plate so that the openings in said grid are of generally the same size as and aligned with said chute upper, open ends;
    means for vibrating said grid;
    a plurality of sensors, one of which is operably mounted on each of said chutes for detecting objects passing through said chutes and emitting a signal for each object;
    a summer electrically connected to said sensors for summing said signals to obtain a total count; and
    a display for displaying said total count.

15. The container counter of claim 14 wherein said chutes are located directly under said hopper.

16. The container counter of claim 1 wherein said chutes are located directly under said hopper.

* * * * *